(12) United States Patent
Ronan

(10) Patent No.: US 9,216,465 B2
(45) Date of Patent: Dec. 22, 2015

(54) RATCHET CUTTING TOOL WITH A REPLACEMENT BLADE STORAGE TRAY

(71) Applicant: John S. Ronan, Temecula, CA (US)

(72) Inventor: John S. Ronan, Temecula, CA (US)

( * ) Notice: Subject to any disclaimer, the term of this patent is extended or adjusted under 35 U.S.C. 154(b) by 273 days.

(21) Appl. No.: 13/851,756

(22) Filed: Mar. 27, 2013

(65) Prior Publication Data

US 2014/0290067 A1 Oct. 2, 2014

(51) Int. Cl.
  *B26B 17/02* (2006.01)
  *B23D 21/10* (2006.01)
  *B26D 3/16* (2006.01)

(52) U.S. Cl.
  CPC ............... *B23D 21/10* (2013.01); *B26D 3/169* (2013.01)

(58) Field of Classification Search
  CPC ......... B23D 21/10; B26D 3/169; B26B 17/02
  See application file for complete search history.

(56) References Cited

U.S. PATENT DOCUMENTS

| | | | |
|---|---|---|---|
| 3,336,667 A | 8/1967 | Wallace et al. | |
| 3,772,783 A | 11/1973 | Averitt | |
| 4,094,064 A * | 6/1978 | Nishikawa et al. | 30/92 |
| 4,176,450 A | 12/1979 | Muromoto | |
| 4,312,127 A * | 1/1982 | Tanaka | 30/92 |
| 4,368,577 A | 1/1983 | Babb | |
| 4,674,184 A | 6/1987 | Anderson | |
| 5,497,554 A | 3/1996 | Hamlin | |
| 5,625,951 A | 5/1997 | Hamlin | |
| 5,718,051 A * | 2/1998 | Huang | 30/250 |
| 6,098,291 A | 8/2000 | Wang | |
| 6,105,256 A * | 8/2000 | Budrow | 30/186 |
| 6,260,279 B1 | 7/2001 | Apolinski et al. | |
| 6,305,087 B1 * | 10/2001 | Huang | 30/250 |
| 6,513,245 B1 | 2/2003 | Aubriot | |
| 6,625,888 B2 | 9/2003 | Heck et al. | |
| 6,658,738 B1 | 12/2003 | King | |
| 7,080,455 B1 | 7/2006 | Ronan et al. | |
| 7,127,819 B1 * | 10/2006 | Huang | 30/92 |
| 7,743,509 B2 | 6/2010 | Macsay et al. | |
| 7,886,446 B2 * | 2/2011 | Yu Chen | 30/175 |
| 8,327,548 B2 | 12/2012 | Ronan | |
| 2005/0050735 A1 | 3/2005 | Huang | |
| 2006/0207101 A1 | 9/2006 | Scarla | |
| 2008/0307657 A1 | 12/2008 | Macsay et al. | |
| 2009/0223059 A1* | 9/2009 | Yu Chen | 30/92 |
| 2010/0212162 A1 | 8/2010 | Ronan | |
| 2014/0290067 A1* | 10/2014 | Ronan | 30/92 |

* cited by examiner

*Primary Examiner* — Hwei C Payer
(74) *Attorney, Agent, or Firm* — Patent Analysis Research Tech. Systems LLC; George L. Walton

(57) ABSTRACT

The improved ratchet cutting tool comprises a first contoured handle member having a first rear end defining a hand gripping portion, a second forward end defining a cradle portion for supporting different size work pieces to be cut. A second contoured handle member having a first rear end defining a hand gripping portion, a second forward end defining a securing means for pivotally attaching a ratchet cutting blade holder and ratchet assembly between the first and second handle members. An intermediate portion including a pair of ramp portions that extends between the cradle portions and the hand gripping portion. The first handle member includes a sliding replacement and display blade storage tray cavity disposed along an exterior side face of the first handle member below the intermediate portion for receiving a sliding replacement and display blade storage tray for storing non-standard angled cutting blades therein.

20 Claims, 6 Drawing Sheets

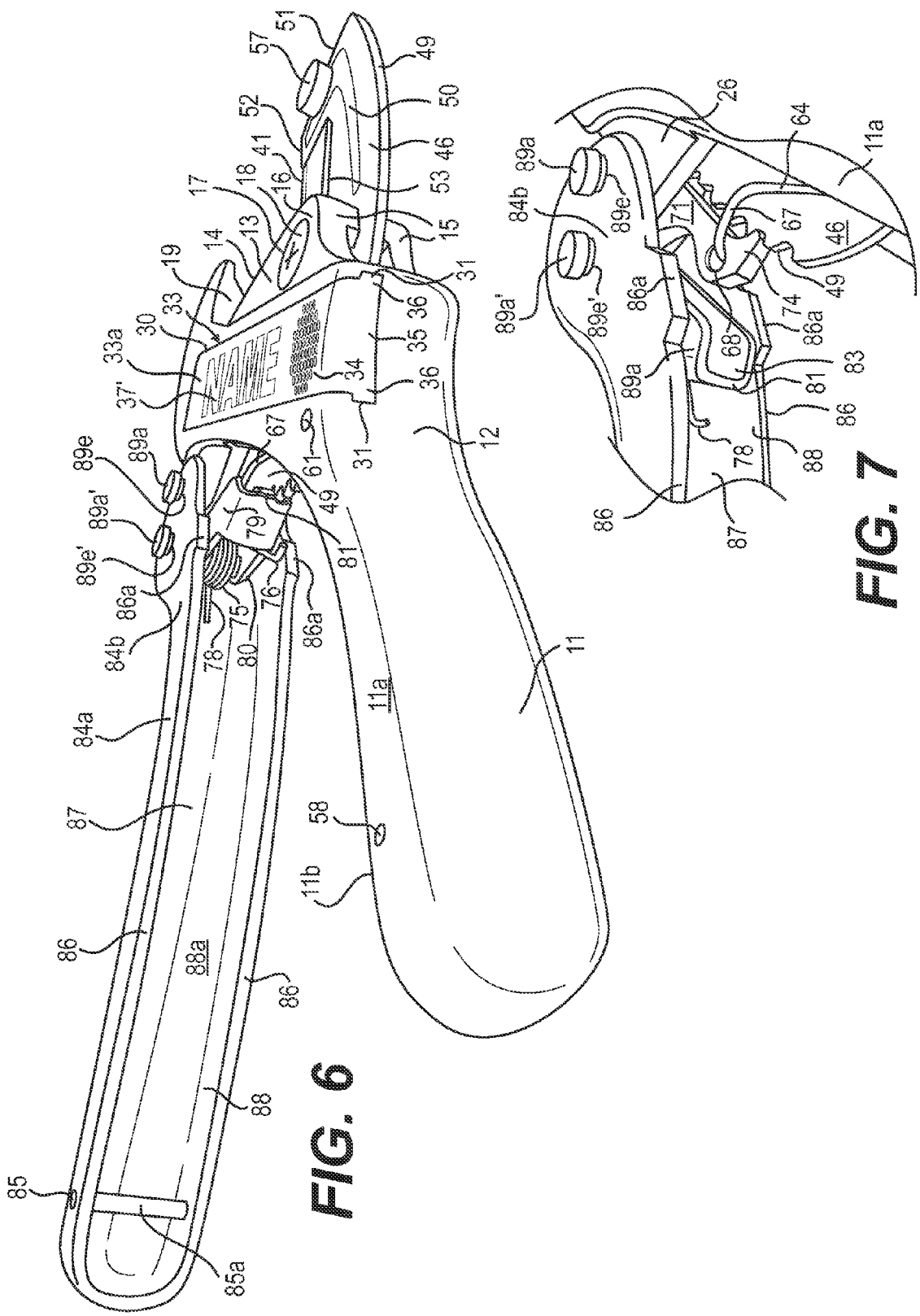

RATCHET CUTTING TOOL WITH A REPLACEMENT BLADE STORAGE TRAY

CROSS REFERENCE TO RELATED APPLICATION(S)

None

BACKGROUND OF THE INVENTION

1. Field of the Invention

The present invention relates generally to the art of hand-held operated cutting tools or devices with a fixed or replaceable cutting blade, and more specifically to a ratchet-type hand tool for cutting different size work pieces, such as, plastic tubing or pipe conduits, rubber hoses, electrical or telephone cables, and other non-metallic materials. Further the present invention relates to a ratchet blade holder for removably attaching a cutting blade thereto without the use of tools and a sliding blade storage tray or compartment disposed along a surface of the hand-held operated cutting tools for housing replacement cutting blades therein.

2. Description of the Related Art

It is well known that a variety of hand-held operated cutting tools have been utilized for cutting different size plastic tubing or PVC tubing or pipe conduits utilized in both the plumbing and electrical industry. These hand-held tools include a pair of handles with one of the handles having a cradle or anvil portion for supporting different size work pieces and the other handle having either a fixed or replaceable cutting blade, wherein the pair of handles are displaceable about a pivot axis there between to easily cut the different size work pieces interposed between the cradle and the cutting blade. A few examples of such hand-held cutting tools are shown in U.S. Pat. Nos. 3,336,667, 3,772,783, 5,497,554, 5,625,951, 6,260,279, 6,513,245, 6,625,888, 6,658,738 7,080,455, 8,327,548 and U.S. Patent Publication Nos. 2006/0207101 and 2010/0212162.

Although, the preferred embodiments of the present invention will be described in connection with a ratchet mechanism for displacing the pipe tubing cutting hand tool with a replaceable cutting blade for cutting different size work pieces. However, it is to be appreciated that the preferred embodiments could be utilized with other types of operating means for displacing the pipe tubing cutting hand tool with a replaceable cutting blade for cutting different size work pieces. The prior art ratchet-type hand-held cutting tools have a cutting blade that is incrementally displaced by a ratchet drive member and a pawl member about a pivot axis that connect a pair of handles together that allow the handles to be squeezed together, to permit the cutting blade to be moved toward the cradle for easily cutting through the different size work pieces. Once the work pieces have been cut the handles are separated from one another and the ratchet drive and pawl member are moved to a position that will allow the different size work pieces to be placed on the cradle, so that another cutting operation can be performed.

These prior art ratchet-type hand-held cutting tools have multiple complex components, such multiple springs, levers, linkages, screws, bolts, nuts, pins, cams, bearings, rollers, grooves or slots that receives the cams, bearings and rollers, ratchet plates with teeth, lock wires, locking washers and blades integrally formed on the ratchet or blade holders or plates or replaceable cutting blades removably associated with the ratchet blade holders. Also, in these prior art the ratchet-type hand cutting tools, tool maintenance including blade removal and replacement can be cumbersome and time consuming. Many of these prior art ratchet-type hand cutting tools have to be partially or completely disassembled by removing pins, screws, bolts, nuts, springs, locking washers, linkages, cams, bearings, rollers and the grooves or slots that receives the cams, bearings and rollers just to remove and replace the cutting blade and blade holder or plate. During the complex removal process, adequate time and specialized time along with specialized skill are often needed to remove and replace the cutting blade and blade holder or plate. For many of these prior art ratchet-type hand-held cutting tools, bulky and cumbersome tools are needed in order to remove and replace the cutting blade and blade holder or plate. Examples of these ratchet-type hand-held cutting tools are shown in U.S. Pat. Nos. 4,176,450, 4,312,127, 4,368,577, 4,674,184, 6,098,291, 7,743,509 and U.S. Patent Publication No. 2008/0307657.

Also, many of the prior art hand-held cutting tools include a storage tray or compartment for housing replacement cutting blades. Note that many of the storage tray or compartment features may take on various designs, shapes and sizes as shown in U.S. Pat. Nos. 5,890,293, 6,000,137, 6,260,279, 6,269,542, 6,625,888 and 8,327,548 and U.S. Patent Publication Nos. 2005/0050735 and 2010/0212162.

Even though the prior art hand-held cutting tools might have been creative, and well-thought-out inventions, that did function well for their intended purposes at the time of their creation, however none describe the unique ratchet blade holder with a removable non-standard cutting blade having a specific design and configuration of the present invention. Also, none of the prior art hand-held cutting tools describe a unique display replacement blade storage tray for replacement cutting blades that is slidable along an intermediate side surface between a handle portion and a cradle portion with locking means to removably secure the sliding display storage tray or compartment in a fixed position. Further, none of the prior art hand-held cutting tools describe the unique ratchet mechanism with a minimum number of ratchet components rather than the cumbersome, complex and multiple components shown in the aforementioned prior art hand-held cutting tools. The minimum number of ratchet components overcomes the use of multiple components that took up too much space within the prior art hand-held cutting tools and the amount of time and skill it takes to assemble and disassemble the ratchet mechanism therein.

SUMMARY OF THE INVENTION

In accordance with the present invention provides an improved ratchet cutting tool, which includes a non-standard or special cutting blade for cutting different size work pieces, such as, plastic tubing or pipe conduits (Synthetic or PVC), rubber hoses, electrical or telephone cables, and other non-metallic materials. Note that the non-standard or special cutting blade is easily replaced manually by unscrewing a thumb screw without the need for using any tools. This improved ratchet cutting tool further includes a sliding replacement blade storage tray with a front face and rear face with an open upper end along its entire length for allowing replacement non-standard or special cutting blades to be inserted and stored therein and removed there from when a non-standard or special cutting blade needs to be replaced.

The improved ratchet cutting tool comprises a first handle member having a first rear end defining a hand gripping portion, a second forward end defining a cradle portion for supporting different size plastic tubing or pipe conduits to be cut, and an intermediate portion disposed between the first and second ends for pivotally attaching a ratchet cutting blade holder thereto. The non-standard or special cutting blade has an upper end that is removably received within a receiving cavity of the ratchet cutting blade holder and a lower end having a cutting edge extending outward of the ratchet cutting blade holder receiving cavity and movable towards and away the cradle portion. This non-standard or special cutting blade has a pair of ends with a preferred angle of at least 60 degrees. It is noted the preferred angle could take on different angles, if desired.

The intermediate portion is defined by an ascending ramp portion having a lower end integrally connected to an upward contoured or arcuate-like portion of the hand gripping portion and an upper end that transforms into an apex portion. Also, a descending ramp portion having an upper end that integrally transforms into the apex portion along with the upper end of the ascending ramp portion with a lower end of the descending ramp portion being integrally connected to the cradle portion. A screw opening is disposed in the intermediate portion adjacent and below the apex portion for receiving a screw member therein for pivotally securing the blade holder via a blade holder securing opening to the intermediate portion.

Still referring to the first handle portion, a display and replacement blade storage cavity is disposed along at least one of the side face surfaces below the screw and screw opening of the intermediate ramp portions. This cavity has one end with an arcuate-like or contoured portion extending from and mating complimentary with the upward contoured or arcuate-like portion of the first handle with the other end being angled and extending to a specified position from the second forward end and below at least a portion of the cradle portion. The display and replacement blade storage cavity is designed to receive the aforementioned sliding replacement blade storage tray for storing or housing replacement non-standard or special cutting blades therein.

Note that the sliding replacement blade storage tray has similar ends that complimentary mate with the arcuate-like or contoured end and the angled end of the display and replacement blade storage cavity so that all components are even and flush with one another. Further, the ascending ramp portion includes a retaining opening or aperture at the lower end adjacent to the upward contoured or arcuate-like portion of the hand gripping portion. The sliding replacement blade storage tray includes an L-shaped slot with a short leg portion that aligns with the retaining opening or aperture of the ascending ramp portion and a longer leg portion extending perpendicular from the short leg portion at upper end portion of the rear face of the display and replacement blade storage tray.

A retaining member is inserted through the retaining opening or aperture and into the short leg portion of the L-shaped slot for securing or locking the sliding replacement blade storage tray within the display and replacement blade storage cavity. In accordance with this feature, the retaining member has a handle portion at an upper end and a bead or bubble at a lower end thereof. The upper end portion of the rear face defined by the L-shaped slot is able to cause a slight flexing or inward movement. This slight inward movement or flexing is achieved when a user grasp a portion of the sliding replacement blade storage tray front face to begin sliding it out of the display and replacement blade storage cavity to gain access to the non-standard replacement blades. As this sliding movement takes place, the upper end portion of the rear face defined by the L-shaped slot will cam against the bead or bubble of the retaining member to allow the retaining member to be easily removed from the short leg portion of the L-shaped slot and the retaining opening or aperture of the ascending ramp so that the display and replacement blade storage tray can be fully removed from the display and replacement blade storage cavity.

In accordance with another aspect of the sliding display and replacement blade storage tray, the front face thereof has a section that can be etched or embossed with a name or display and spaced from the etched or embossed name or display is a rough raised section adjacent the arcuate-like end thereof for allowing a user place their thumb or finger thereon for easily sliding the display and replacement blade storage tray out of the display and replacement blade storage cavity.

A second handle member having a first rear end defining a hand gripping portion and a second forward end pivotally attached to a lower extending portion of the first handle member. The forward end further includes at least a stop member at an upper end and disposed inward thereof to contact a lower surface of the first handle member when the first and second handles are squeezed together to perform a complete cutting operation of a work piece.

In accordance with a further aspect of the present invention, the ratchet operating mechanism will now be discussed. It is important to know that ratchet mechanisms for cutting work pieces, such as plastic pipes or tubing are well known. However, none of the prior art utilizes fewer parts or components and arranged in the manner as shown in the present invention.

The ratchet mechanism includes a cutter blade holder with serrated teeth along an outer edge portion of the blade holder, a drive pawl, a locking or catch pawl, and first and second torsion springs disposed between and held within cavities of the first and second handles by a plurality of pin securing means. The drive and catch or locking pawls are pivotally rotated on the plurality of pin securing means and held in a biased position by the respective first and second torsion springs along the serrated teeth of the cutter blade holder.

Further, the first torsion spring includes a first leg portion extending from one end of a coil section with a connecting end secured to the blade holder via a securing hole or opening, and a second leg portion extending from the other end of the coil section with a connecting end secured to the catch or locking pawl via a securing hole or opening in an upper end of the catch or locking pawl for providing a biasing force to the blade holder and the catch or locking pawl. In regard to the coil section, it is secured within an open cavity at a specified location from a bottom end thereof between a pair of sidewalls of the first handle member. The coil section is pinned or secured by a securing pin, screw or various other types of securing means received there through via openings disposed through the pair of sidewalls at the specified location.

The second torsion spring includes a first leg portion extending from one end of a coil section and a second leg portion extending from the other end of the coil section for providing a biasing force to the drive pawl. Further, the first leg portion extends through an open portion of the drive pawl for supporting and biasing the drive pawl thereon. The second leg portion is biased and supported along a bottom surface or floor portion of an open cavity from an upper end of the second handle member. Furthermore, the coil section is secured within the open cavity at a specified location between a pair of sidewalls of the second handle member near the bottom surface or floor portion. The coil section is secured at the forward end of the second handle member by a securing pin, screw or various other types of securing means received there through via openings disposed through the pair of sidewalls at the specified location.

This ratchet mechanism is arranged and designed to enable a sufficient mechanical advantage to be selected during the cutting blade movements when the first and second handles are squeezed toward on another. Such cutting blade movement positions will establish the required maximum cutting force without having to use excessive hand force on the first and second handles in order to easily cut different size work pieces, such as, plastic tubing or pipe conduits, rubber hoses, electrical or telephone cables, and other non-metallic materials resulting in a smooth cut without rough or jagged edges.

Additional features, benefits, objects and advantages of the improved ratchet cutting tool will become apparent to those of ordinary skill in the art upon reading and understanding the following detailed description made in connection with the accompanying drawings.

BRIEF DESCRIPTION OF THE DRAWINGS

The present invention may be better understood, along with its numerous objects, features, and advantages made apparent to those skilled in the art by referencing the accompanying drawings.

FIG. 6 illustrates an isometric view of the improved ratchet cutting tool with the sliding replacement and display cutting blade storage tray in the open position according to the preferred embodiment of the present invention from a top angle.

FIG. 7 illustrates a cut-out sectional view detailing the ratchet mechanism device according to the first preferred embodiment of the present invention.

DETAILED DESCRIPTION

Reference will now be made in detail to the preferred embodiments of the invention, examples of which are illustrated in the accompanying drawings. While the invention will be described in conjunction with the accompanying drawings, it will be understood that they are not intended to limit the invention to the accompanying drawings. On the contrary, the present invention is intended to cover alternatives, modifications and equivalents, which may be included within the spirit and scope of the invention as defined by the appended claims.

Figure 1:
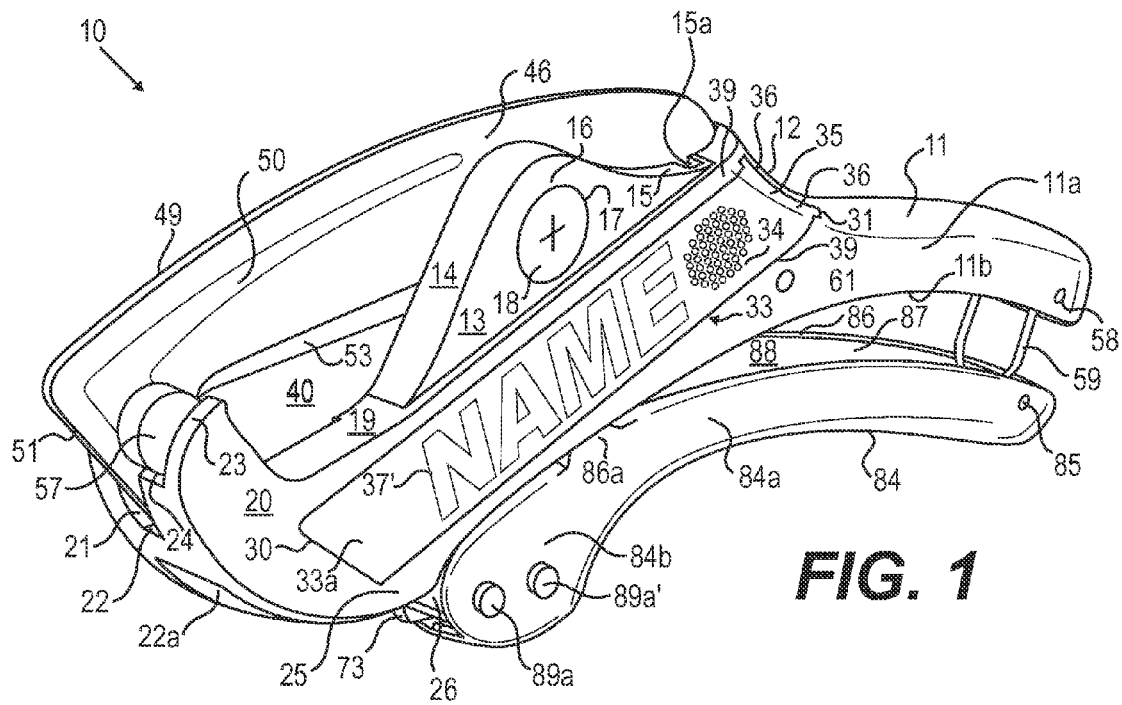
FIG. 1 illustrates a perspective view of a closed position of an improved ratchet cutting tool with a sliding replacement and display cutting blade storage tray in accordance to the preferred embodiment of the present invention.
Figure 2:
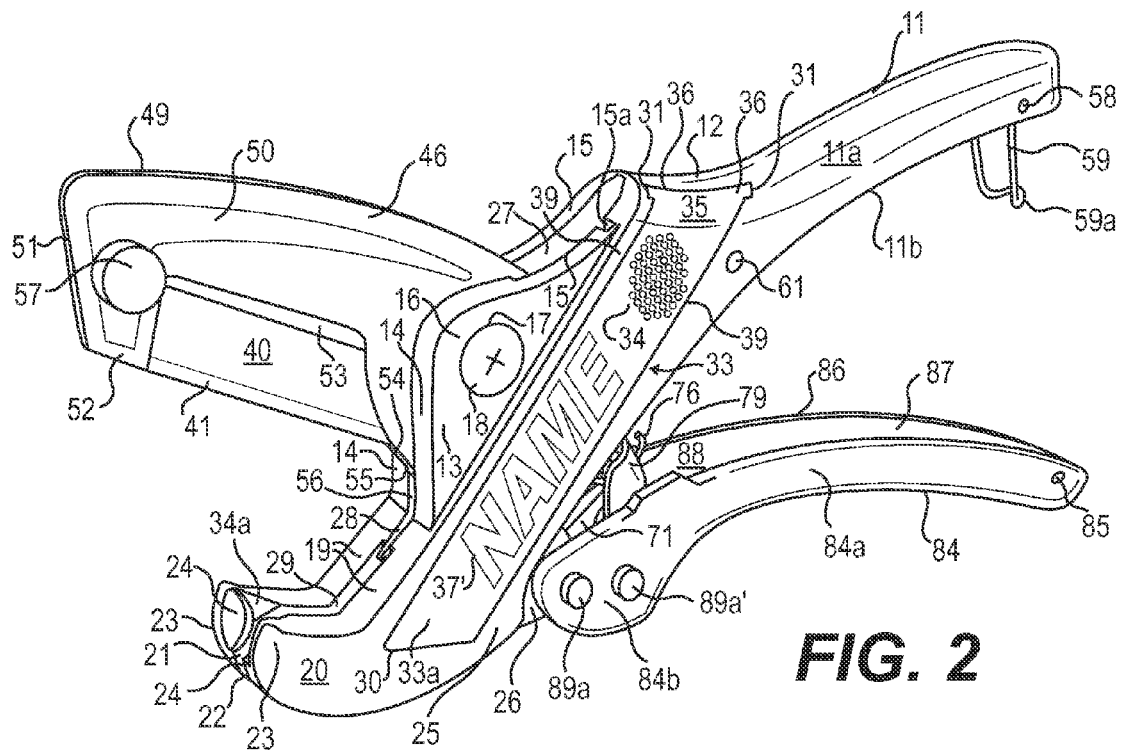
FIG. 2 illustrates a side isometric plan view of the improved ratchet cutting tool in an open position with a sliding replacement and display cutting blade storage tray in accordance to the preferred embodiment of the present invention.

FIGS. 1-2 of the preferred embodiment of the present invention show an improved ratchet cutting tool with a sliding replacement and display blade storage tray assembly 10 the ratchet cutting tool in a closed position in FIG. 1 and in an open position in FIG. 2. These Figures which are very similar and will be discussed together to limit the detailed written description The improved ratchet cutting tool assembly 10 includes a first handle member 11 having two opposing sections that are mechanically joined together as a single unit. The single unit forms a first handle member 11 that includes first rear ends defining hand gripping portions 11a, 11b, forward ends 20, 23 defining cradle portions 19 for supporting different size plastic tubing or pipe conduits to be cut (not shown), and intermediate portions 13 disposed between the first rear and second forward ends for pivotally attaching a ratchet cutting blade holder 46 thereto.

The opposing intermediate portions 13 are defined by ascending ramp portions 15 having lower ends integrally connected to upward contoured or arcuate-like portions 12 of the hand gripping portion 11a, 11b to upper ends defining apex portions 16. Descending ramp portions 14 have upper ends that are integrally joined to the apex portions 16 with the upper ends of the ascending ramp portions 15. The lower ends of the descending ramp portions 14 are integrally connected to rear ends of the cradle portions 19. A forward end of the cradle portions 19 is defined by an inclined surface 19a (See FIG. 3) ending at a top end 23 of the forward ends 20. An extending raised portion 19b is located underneath and extending along the entire length of the cradle portions 19 and the inclined surfaces 19a on at least one side thereof for reinforcement purposes (See FIGS. 4-5).

The top ends 23 has an interior cavity 24 for freely receiving a securing screw device with a head 57 within one of the cavities 24 and a securing screw nut 57b that is received on a screw head stem 57a is disposed within the other one of the cavities 24 as the cutting blade edge 41 cuts through work pieces (not shown). The cavities 24 further includes a bottom surface that allows the screw head 57 and screw nut 57b to bottom out once the work piece has been cut all the way through to enable an easy and smooth cut of the work piece. Also, the cavities 24 have a shaved or beveled edge 34a that is angled downward along an interior edge of the cradle inclined surfaces 19a to provide an additional clearance to permit the screw head 57, screw nut 57b and a forward bottom end 52 of the blade holder 46 to move freely move without any disturbances during the cutting of a work piece.

Still further, in the preferred embodiment as shown in FIGS. 1-2, the first handle member 11 opposing sections forms a continuous open cavity 27 (See FIG. 2) there between that extends from the lower ends of the ascending ramp portions 15 at the arcuate-like portions 12 and through the intermediate sections 13 ending at the lower end of the descending ramp portions 14 connected to the rear end of the cradle portions 19 for allowing a portion of the blade holder 46 to pivoted freely there through in closed and open positions. A screw opening 17 is disposed through and substantially at a central location in the opposing intermediate sections 13 below the ramps 14, 15. This opening 17 receives a screw member 18 with a stem element 18a that extends through the opposing intermediate sections 13 for pivotably securing the blade holder within the continuous open cavity 27 of the handle member 11 by a screw nut 18b (See FIGS. 4 and 5).

Also, the first handle member 11 opposing sections include inwardly extending surfaces that abut one another to form a shallow channel 29 (See FIG. 2) extending from the lower end of the descending ramp portions 14 connected to the rear end of the cradle portions 19 to a shallow channel end 22 at front surfaces 23 of the forward ends 20. The shallow channel 29 (See FIG. 2) has a depth that is defined by interior sidewalls 21 of the first handle member 11 opposing sections that extends from the inwardly extending surfaces upward to the cradle portions 19. Note that this depth will allow the cutting edge 41 (See FIG. 2) of the non-standard cutting tool blade 40 to bottom out in the channel after a work piece (not shown) has been entirely cut all the way through. Furthermore, the channel will allow the bottom end 52 and the angled forward end 51 of the blade holder to freely move and bottom out in the channel 29 when a work piece (not shown) has been cut through without any interference.

FIGS. 1-2, further shows the front surfaces 23 extending downward in an arcuate or curved bottom surfaces to extension members 26 projecting downward from opposing sections of the first handle member 11. Further, the curved bottom surfaces angles slightly upward at elements 25 into straight bottom surfaces that continue into curved bottom surfaces 11b to the rear of the first handle member 11.

Figure 8:
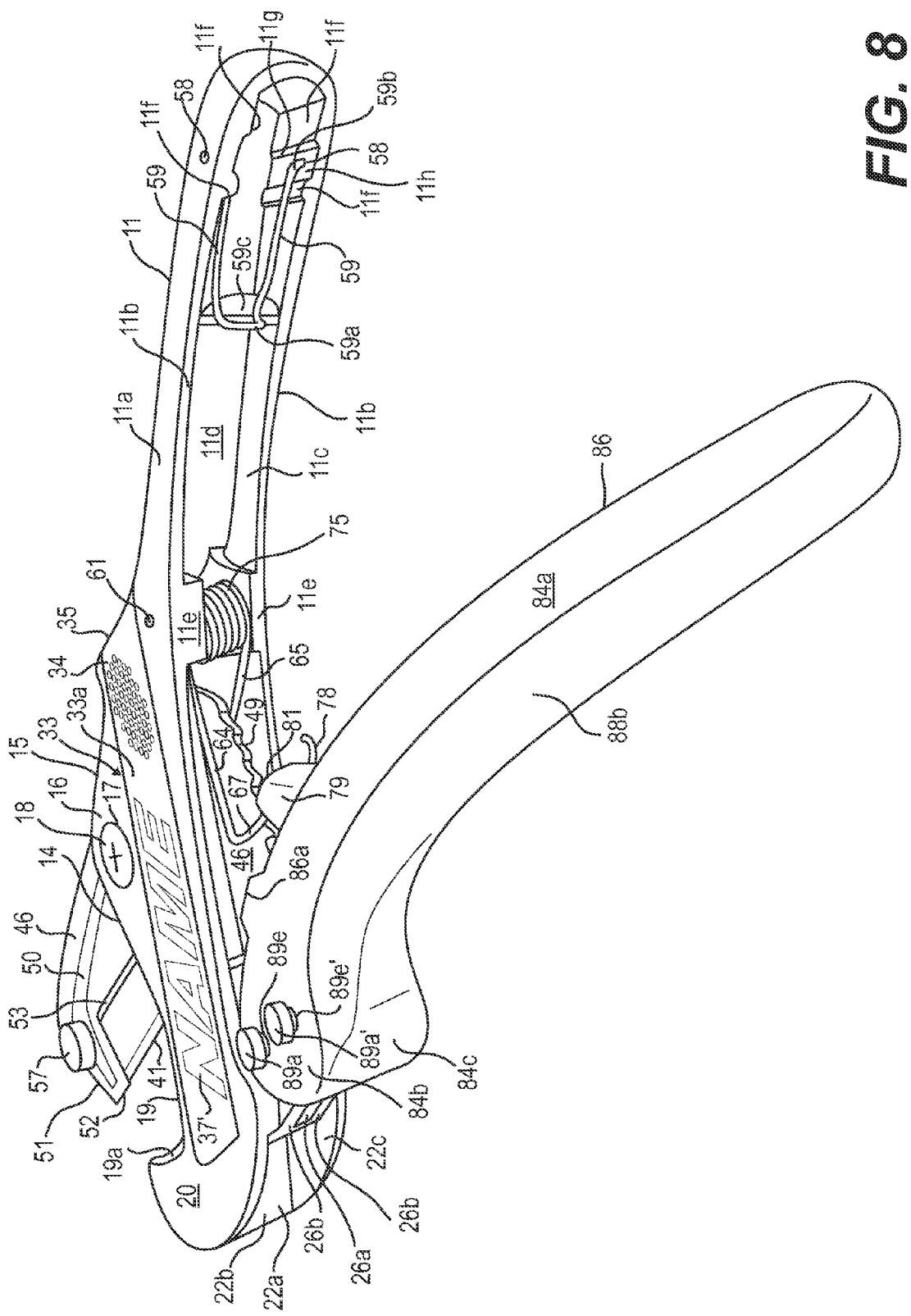
FIG. 8 illustrates an isometric view of the improved ratchet cutting tool with the sliding replacement and display cutting blade storage tray in the open position according to the preferred embodiment of the present invention from a bottom angle.

Interiorly of the forward ends 20, 23 and below a portion of the shallow channel 29 and a portion the cradle portion 19, 19a an open space 22a is formed as shown in FIG. 8. The space 22a is open from the front shallow end 22 to an undersurface of shallow channel 29 with downward opposite extending side wall portions 22c of the opposite forward ends 20, 23. The opposite extending side wall portions 22c is closed at a back end by downward extending back wall portions 26b and a smaller downward angle portion 26a only from the first handle member 11 of the front side with the sliding and display storage tray assembly 33. The downward extension members 26 are formed by the downward extending back wall portions 26b and the smaller downward angle portion 26a with pin securing openings 26a formed therein.

With continued reference to FIGS. 1-2, the curved bottom surfaces 11b and the top curved surfaces of first handle member 11 are joined together by sidewalls 11a of the opposing handle sections. The top curved surfaces and the bottom curved surfaces 11b allow a user to easily and comfortably grip the handle member 11 without using great hand force to cut through work pieces (not shown). The rear ends of the handle member 11 include securing pin latch openings 58 for receiving a U-shaped latch 59 with perpendicular bent ends 59b (See FIG. 8) to be pivotally secured within the latch openings 58. Also, the U-shaped latch 59 has a bottom end that is bent upward and extending perpendicular to the U-shaped latch 59 defining a lock latching member 59a (See FIGS. 2 and 8).

Referring now to the second handle member 84 of FIGS. 1-2, the second handle member 84 has a curved portion that extends from a first rear end to a second larger curved forward end 84b on both sides thereof defining a hand gripping portion 84a, 88b. The second handle member 84 further includes upstanding exterior opposite sidewalls 84a and interior upstanding sidewalls 87 with a top edge 86 defining a contoured interior cavity 88. At the rear ends of the second handle member 84 are latch pin openings 85 for receiving a latching pin 85a (See FIG. 6) for latching the U-shaped latch 59 to lock the first handle member 11 and the second handle member 84 together (See FIGS. 1 and 4). The second larger curved forward end 84b has a first locking pin 89a with a head portion on one end thereof and a second locking pin 89a' with a head portion on one end thereof, the first locking pin 89a being secured at the forward ends 84b for attaching the first handle member 11 and the second handle member 84 together for pivotal or rotational movement.

Also, the first locking pin 89a is secured through the forward ends 84b for attaching a lower end 73 of the catch pawl 71 (See FIG. 3) within the cavity 88 to the first handle member 11 and the second handle member 84 through first pin openings 89e. A second locking pin 89a' positioned and spaced inward of the first locking pin 89a that extends through the forward ends 84b that attaches a bottom end of the drive pawl 79 through drive pawl locking pin openings 82, coil spring 75 and coil spring opening 77 within the cavity 88 to the first handle member 11 and the second handle member 84 through second pin openings 89e'.

Still referring to the second handle member 84, the top edge 86 on both sides of the handle member 84 includes a raised abutment member 86a. This abutment member 86a provides a stop engagement with a portion of the substantial straight portion extending under the intermediate portion 13 of both of the bottom end surfaces 11b. Also, FIG. 8 shows a better illustration of the bottom surface 88b of the contoured second handle member 84, which is not shown in the other previous mentioned FIGS. 1-7 and 9-10.

One of the most important features of the instant invention is the sliding replacement and display blade storage tray assembly 33 disposed along at least a sidewall surface extending from the upward contoured or arcuate-like portions 12 of the hand gripping portion 11a, 11b to the forward ends 20 and positioned underneath the intermediate portions 13 and the cradle portions 19. This feature is shown in FIGS. 1-3, 6-8 and 10 for more details. This feature will now be discussed.

The sliding replacement and display blade storage tray assembly 33 is utilized to store non-standard cutting tool blades 40 therein for easy replacement of a non-standard cutting tool blade 40 in the ratchet cutting tool 10 whenever it is deemed necessary. The non-standard tool cutting blade 40 is defined as a unique and new design type of replacement cutting tool blade that is not one of the current existing or any old types of cutting tool blades. An elongated sliding tray receiving cavity 30 is disposed in the aforementioned sidewall surface with one end being a specified angled end 32a and the other end being a contoured or arcuate-like end surface 32 that is an inside edge of the contoured or arcuate-like portions 12 of the handle member 11.

The elongated sliding tray receiving cavity 30 includes an upper exterior wall portion 39 with a downward extending upper end wall surface 39a and a lower exterior wall portion 39' with an upward extending lower end wall surface 39b with notch ends 31 defining elongated recessed or receiving channels extending along the entire length thereof. The elongated recessed or receiving channels 31 being disposed inward of the upper and lower exterior wall portions 39 and 39' with a slightly deeper depth than the downward extending upper end wall surface 39a and the upward extending lower end wall surface 39b (See FIGS. 1-3). Also, the sliding replacement and display storage tray assembly 33 further includes a replacement non-standard cutting tool blade opening 38 for inserting therein or removing there from the non-standard cutting tool blades 40.

The sliding replacement and display blade storage tray assembly 33 includes a front surface 33a and a back surface 33b (See FIG. 10) with a pair of ends 35, 35a, one end having a contoured or arcuate-like end 35 and the other end defining a preferred angled closed end 35a. The contoured or arcuate-like end 35 has a pair of upper and lower wall receiving rear end projection surfaces 36 defining a pair of top rear and front upper wall end surface portions 37 37a, respectively, and a bottom wall end 37b that extends between the contoured or arcuate-like end 35 to the closed angled end 35a of the sliding replacement and display blade storage tray assembly 33. The pair of upper wall receiving rear end projection surfaces 36 of the sliding replacement and display blade storage tray assembly 33 includes a top wall portion defining the rear upper wall end surface portion 37 and the front upper wall end surface 37a that is slightly shorter in height than the rear upper end surface portion 37 with the non-standard cutting tool blade opening 38 formed there between to allow the replacement non-standard cutting tool blades 40 to be inserted there through to be stored and removed there from for blade replacement, and the non-standard cutting tool blade opening 38 extends along the entire length of the sliding replacement and display blade storage tray assembly 33 from the contoured or arcuate-like end 35 to the closed angled end 35a.

Also, the other pair of lower wall projection surfaces 36 of the sliding replacement and display blade storage tray assembly 33 includes a front wall bottom portion defining a lower end surface portion 37b that is slightly shorter in height than a rear lower end surface portion 37c (not shown) and closed by a lower wall member there between (not shown), which extends along the entire length of the sliding replacement and display blade storage tray assembly 33 from the contoured or arcuate-like end 35 to the closed angled end 35a.

Figure 3:
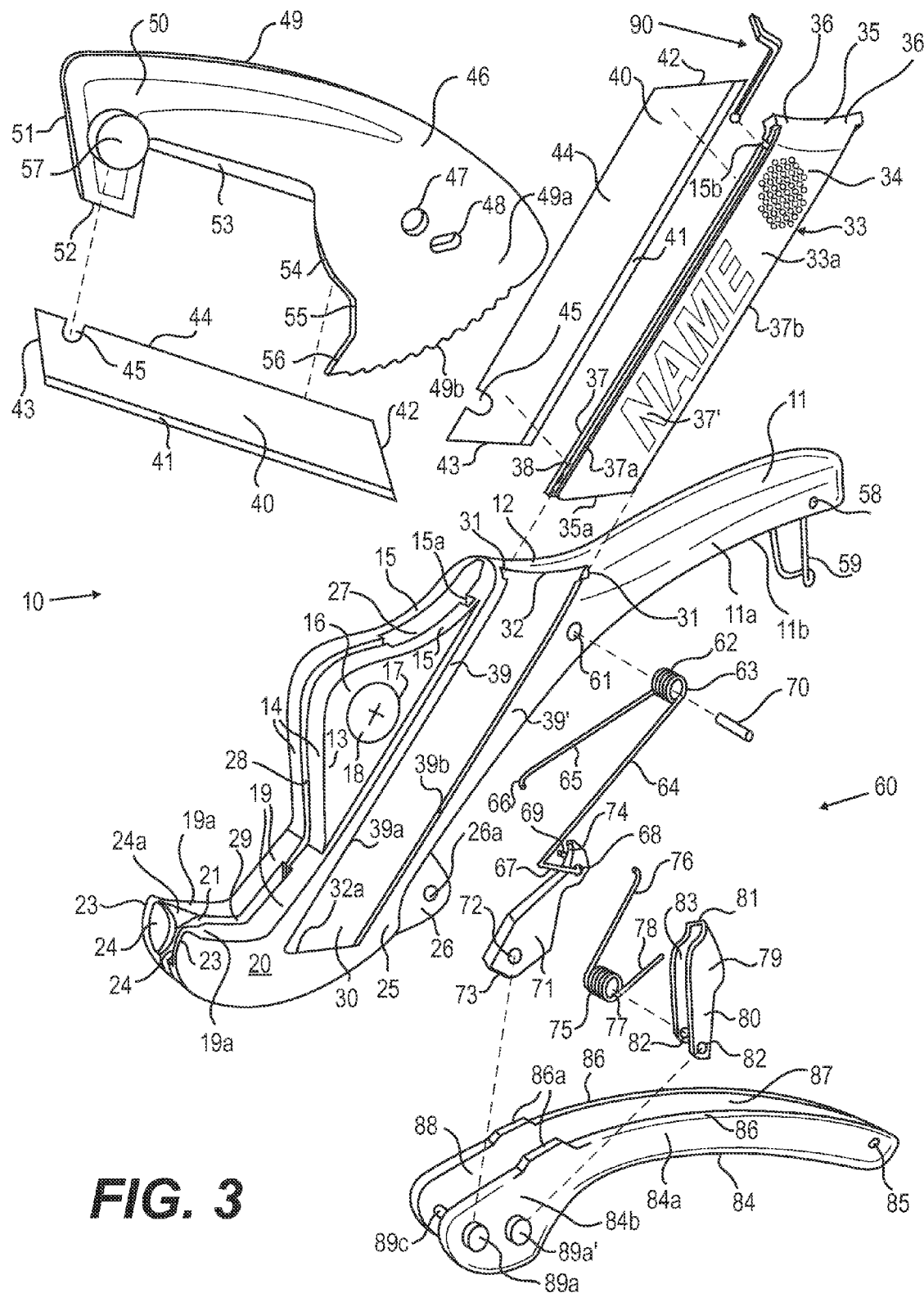
FIG. 3 illustrates an exploded perspective view of the improved ratchet cutting tool with a sliding replacement and display cutting blade storage tray in accordance to the preferred embodiment of the present invention.

This arrangement allows the rear upper end surface portion 37 and the slightly shorter top front upper end surface portion 37b (as shown in FIG. 3) to slide along the top bottom end surface 39a and the lower end surface 37a to slide along the lower top end surface 39b. Further, the top and lower rear end surfaces 37, 37a, 37b and 37c are adapted to slide along and within the recessed channels 31, until the closed angled end 35a of the sliding replacement and display blade storage tray assembly 33 abuts with the arcuate-like end 32a of the replacement and display storage tray cavity 30 and the contoured or arcuate-like end 35 engages the contoured or arcuate-like inside edge surface 32 of the contoured or arcuate-like portions 12 of the handle member 11. This sliding relationship forms a continuous smooth surface there between when the sliding replacement and display storage tray assembly 33 has been fully inserted in the replacement and display storage tray cavity 30.

Now referring to FIGS. 1-3, 6-8 and 10, the sliding replacement and display blade storage tray assembly 33 has a display section 37' for example, to display a name, symbol, graphics, art/picture, etc., to name just a few. Note that other types of display items could be utilized, if desired. In addition, the sliding replacement and display blade storage tray assembly 33 further includes a thumb or finger grip 34 to easily grip and slide the replacement and display blade storage tray assembly 33 along the elongated sliding tray receiving cavity 30 and there from to insert or remove there from in order to fill the replacement and display blade storage tray assembly 33 with at least one new non-standard replacement cutting tool blade 40 or to remove at least one new non-standard replacement cutting tool blade 40 there from to change the existing non-standard cutting tool blade 40 in the ratchet cutting tool 10.

Noting particularly to FIGS. 1-3, 5 and 10 a retaining assembly 15, 15a-15c, 90-95 will now be described. At least one of the lower ends of the ascending ramp portions 15 adjacent to the upward contoured or arcuate-like portions 12 of the hand gripping portion 11a, 11b has a retaining slot 15a for receiving a slot retaining device 90 therein to retain the sliding replacement and display blade storage tray assembly 33 within the sliding replacement and display blade storage tray cavity 30. The sliding replacement and display blade storage tray assembly 33 has an L-shaped retaining slot 15b, 15c defining a short leg portion 15b extending from the top portion of the slightly longer rear upper end surface portion 37 to a longer leg portion 15c extending perpendicular from 15b to a specified distance along a back surface face of the sliding replacement and display blade storage tray assembly 33, and being spaced from the top portion of the rear upper end surface portion 37 at a selected distance.

Figure 10:
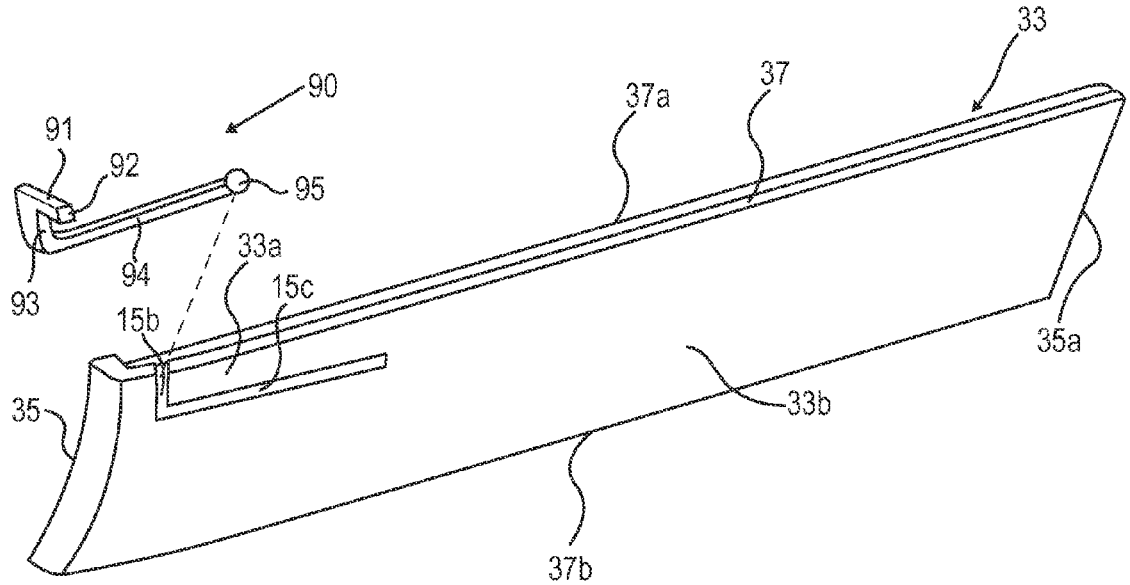
FIG. 10 illustrates an auxiliary rear view of the sliding replacement and display cutting blade storage tray with a locking pin according to a second preferred embodiment of the present invention.

FIG. 10 shows the entire L-shaped retaining slot 15b, 15c and FIGS. 1-3 and 5 only shows the upper opening 15a disposed in the at least one of the lower ends of the ascending ramp portions 15 that is connected to the short leg slot portion 15b of the L-shaped retaining slot 15b, 15c. This L-shaped slot 15b, 15c is configured to have some flexibility when the slot retaining device 90 is received therein. FIGS. 3 and 10 show the details of the slot retaining device 90. Details of the slot retaining device 90 will now be described.

Note that the length of the slot retaining device 90 shown is only for illustration and clarity purposes. The slot retaining device 90 includes a handle or grip member 91, a grip extension member 92, a L-shaped retaining stem with a short stem leg portion 93 at an upper thereof, a longer stem leg portion 94 extending from the short stem leg portion 93 to a retaining bead or bubble member 95 disposed at a lower end of the a longer stem leg portion 94. Further, the formation of the L-shaped retaining slot 15b, 15c in the slightly longer rear upper end surface portion 37 establishes a flexible section to allow the bead or bubble member 95 to be easily inserted therein and removed there from without getting the short stem leg portion 94 from getting stuck or jammed within the short leg 15b of the L-shaped slot.

In operation, a user grasps the slot retaining device 90 and inserts the longer stem leg portion 94 through the upper opening 15a into the short leg portion 15b until the retaining bead or bubble member 95 reaches the bottom end of the short leg portion 15b. Once the longer stem leg portion 94 and the bead or bubble member 95 have been fully inserted, the short stem leg portion 93 with rest on the upper surface of slightly longer rear upper end surface portion of blade opening 38 adjacent the contoured or arcuate-like portion 35 of the sliding replacement and display blade storage tray assembly 33. In this position, the handle or grip member 91 and the grip extension member 92 extends over the contoured or arcuate-like portion 35, so that a user can easily grasp them and pull the slot retaining device 90 from the L-shaped retaining slot 15b, 15c.

Also, the handle or grip member 91 and the grip extension member 92 may be slightly rotated to cause the flexible section defined by the L-shaped retaining slot 15b, 15c to slightly flex so that the slot retaining device 90 can be easily removed from the L-shaped retaining slot 15b, 15c. Then the sliding replacement and display blade storage tray assembly 33 can be removed from the elongated cavity 30 so that at least one new non-standard replacement cutting tool blade 40 can be inserted therein for storage purposes or removed there from to replace the existing non-standard cutting tool blade 40 of the ratchet cutting tool assembly 10 with a new replacement non-standard cutting tool blade 40 when deemed necessary.

FIG. 3 shows an exploded perspective view that shows all of the components of the preferred cutting tool assembly 10. However, all of the elements will not be discussed again, because they have been described in great details in the aforementioned description of FIGS. 1-3, 5 and 10. Only those components that were not believed to have been described for a greater understanding will now be described.

Still referring to FIG. 3, the sliding replacement and display blade storage tray assembly 33 shows a detailed non-standard cutting tool blade 40 that can be inserted or removed there from. The non-standard cutting tool blade 40 includes a cutting end 41, a pair of angled ends 42, 43, a top end 44 and a U-shaped slot 45 that receives the screw stem 57a (See FIGS. 4-5 and 9) of the previous mentioned screw device to allow the screw head 57 and screw nut 57b (See FIGS. 4-5 and 9) to be tightened against the opposite sides of blade holder 46 to hold the non-standard cutting tool blade 40 within a blade holder cavity 54 (See FIGS. 1-6).

Figure 9:
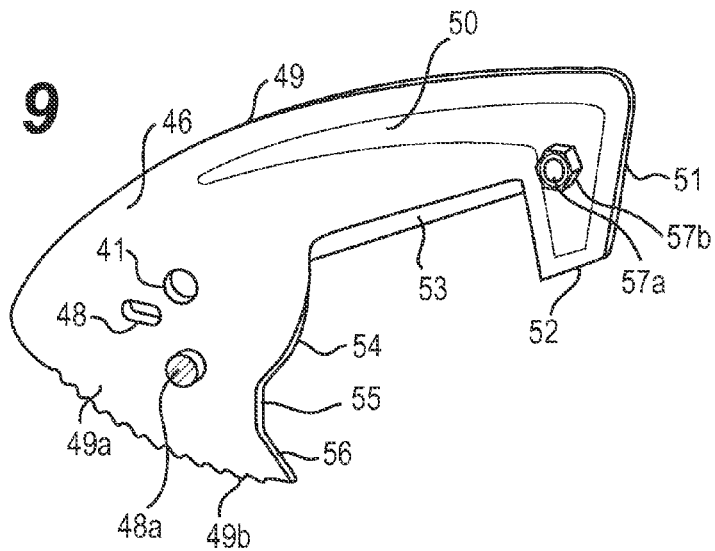
FIG. 9 illustrates a perspective side view of the blade holder according to the first preferred embodiment of the present invention.

With particular reference now to FIGS. 3 and 9, the blade holder 46 will now be described in more details. The blade holder 46 includes a pair of sides with a solid top end 49, a rear section with a plurality of spaced apart teeth 49b configured to cooperate with the catch pawl 71 and the drive pawl 79, a front or forward angled end 51 with an open portion defining the cavity 54 that extends to a bottom end portion 52 and upward to a beveled section 53 of a specified depth that is inward and spaced from the front or forward angled end 51, and a curved inner portion defining the other end of cavity 54 at a rear thereof. It is noted that the non-standard cutting tool blade 40 will extend from within the front or forward angled end 51 to the curved inner portion at the rear of cavity 54.

Further, the curved inner portion at the rear of cavity 54 is spaced inward of the plurality of spaced apart teeth 49b. The non-standard cutting tool blade 40 angled end 43 and the portion of the non-standard cutting tool blade 40 end 41 that is disposed within the front or forward angled end 51 and within the bottom end 52 that are not exposed. Also, the non-standard cutting tool blade 40 angled end 42 is disposed within the curved inner portion and not exposed. Therefore, the only part of the non-standard cutting blade 40 that is exposed is the non-standard cutting tool blade portion 41 and the portion of the non-standard cutting tool 40 that extend along the entire length of the beveled section 53 between the bottom end portion 52 and the curved inner portion at the rear of the cavity 54.

Furthermore, the beveled section 53 is designed to provide somewhat of a tight engagement with the non-standard cutting tool blade 40 when fully inserted. However, this somewhat tight engagement still allows for an easy insertion or removal of the non-standard cutting tool blade 40. The non-standard cutting tool blade 40 angled ends 42, 43 have a preferred angle at a specified degree to allow the non-standard cutting tool blade 40 to fit snug and properly within the entire cavity 54. It is noted the preferred angle could take on different angles, if desired.

Further, the blade holder 46 is constructed from a metal material with a certain thin thickness to freely accommodate the continuous open cavity 27 between the first and second handle member 11 sections. To provide added strength to the thin blade holder 46 a raised elongated element 50 is disposed on both sides thereof and extends between the forward angled end 51 and the hole or opening 47 thereof near the top end 49 of the blade holder 46 with a decreasing dimension as it approaches the hole or opening 47. The hole or opening 47 is designed to receive the screw member 18 with the stem element 18a that extends through the opposing intermediate sections 13 for pivotably securing the blade holder 46 within the continuous open cavity 27 of the handle member 11 by the screw nut 18b (See FIGS. 4 and 5).

Further, an aperture or slot 48 is disposed between the hole or opening 47 and the plurality of teeth 49b that extends through both sides and is designed to receive the bent leg end 66 of coil spring 62. A concave configuration defined by elements 55 and 56 extends from the curve portion to an end of the inner section that closes the other end of the cavity 54 by a solid portion to a lower end where the plurality of spaced apart teeth 49b begin in an upward direction along the rear end 49a that cooperate with ratchet assembly 60.

As shown in FIG. 9, at least one of the opposite sides of the blade holder 46 includes a stop member 48a that protrudes a specified distance there from to abut an interior wall portion within the continuous open cavity 27 to stop the pivotal movement of the blade holder 46 in a fully open or retracted position. This action happens when at least one of the first handle member 11 or the second handle member 84 is pulled apart by a user after the cutting tool assembly 10 has been ratcheted to a work piece cutting position.

Now, as the user pulls apart the at least one of the first handle member 11 or the second handle member 84, the catch pawl 71 and the drive pawl 79 will disengage from the plurality of teeth 49b by the stretching of ratchet coil spring 62 that is cooperatively attached between an upper opening 68 of the catch pawl 71 and the aperture or slot 48 of the blade holder 46, causing the blade holder 46 to quickly spring back to a pivotal retracted position about the screw device 57, 57a, 57b until the stop member 48a abuts the interior wall portion within the continuous cavity 27. Once in this position, the non-standard blade 40 can be easily replaced or the ratchet cutting action can start again, if desired. Note that both handle members 11 and 84 can be pulled apart simultaneously as well to achieve the same result, if desired.

In further details, referring to FIGS. 3, 6 and 7, the ratchet assembly 60 components will now be described in greater detail. The ratchet assembly 60 includes a catch pawl 71, a catch pawl coil spring 62, a drive pawl 79 and a drive coil spring 75. This ratchet assembly has been improved to only require 4 components to cooperate with the plurality of teeth 49b of the blade holder 46. The arrangement and cooperative relationship of the ratchet assembly 60 components will now be described.

The catch pawl 71 has a configuration with multiple and different dimension angled connected sides (such as a polygon type shape) has an upper catch end 74 with a spring opening 68, a bottom end 73 with a securing pin opening 72. The catch pawl spring 62 has a coil section with an opening 63 there through. One end of the coil section of the catch pawl spring 62 includes a first leg portion 64 with bent portions 67 and 69 at the end thereof forming a U-shape. The other end of the coil section of the catch pawl spring 62 includes a second leg portion 65 with a bent portion 66 at the end thereof. The drive pawl 79 has an elongated shape with a pair of sides 80 that has an upper wider dimensional portion with a lower thinner dimensional portion extending downward to an end defining securing pin openings therein. Also, the a pair of sides 80 forms an interior space 83 that that is open there through from the bottom end upward to a specified distance defining solid closed portion with a top end 81 (See FIGS. 3 and 6-7).

In more detail, still referring to FIGS. 3 and 6-7, the connection of the components of the ratchet assembly 60 and the operation thereof will now be described.

The catch pawl 71 is secured within the contoured interior cavity 88 by a forward most end first locking pin member opening 89e adjacent a front end thereof (See FIGS. 6 and 7) having a first locking pin head 89a with a locking pin stem 89c extending there from and extending through the first locking pin member opening 89e at the forward most end of the second handle member 84 and through the bottom end opening 73 of the catch pawl 71. A pin clamp or retainer 89d (See FIGS. 4 and 5) is secured on the end of first locking pin stem 89c that protrudes out of the first locking pin member opening 89e to the opposite side of the handle member 84 opposite the head portion of the first locking pin 89a for securing and maintaining the catch pawl 71 within the cavity 88 and between the first handle member 11 and second handle member 84. In order to secure the catch pawl 71 between the first handle member 11 and second handle member 84, the first locking pin stem 89c is received through an extension member opening 26a of the extension member 26 of the first handle member 11 and retained by a pin clamp or retainer 89d on the end of the first locking pin stem 89c that protrudes out of the first locking pin member opening 89e (See FIGS. 3-5).

Further, the catch pawl coil spring 62 coil section is disposed within a contoured interior cavity 11d formed between a pair of interior wall portions 11c. The contoured interior cavity 11d includes a pair of protruding wall members 11e that extend a specified distance into the interior cavity 11d. Next, the coil spring section 62 is positioned between the protruding wall members 11e and a retaining pin 70 is inserted through a pair of aligned openings 61 disposed on opposite sides 11a of the first handle member 11 and through the coil spring opening 63 to secure the coil spring section 62 within the interior cavity of the first handle member 11. Also, the U-shaped bent portions 67, 69 of the first leg portion 64 is inserted through the upper catch pawl opening 68 with the catch end 74 being supported within the U-shaped bent portions for completely securing the catch pawl 71 and catch pawl coil spring 62 with interior cavities 11d and 88 of the first and second handle members 11 and 84, respectively.

With continued reference to the ratchet assembly 60, the lower thinner dimensional portion of the drive pawl sides 80 having the securing opening 82 adjacent the end thereof that receives a second locking pin stem 89c' extending from the head portion of the second locking pin 89a spaced from the first locking pin device 89, 89a-89d. The second locking pin stem 89c' is first inserted through a second locking pin opening 89e' on one side of the second handle member 84, through the securing opening 82 and through the second locking pin opening 89e' on the opposite side of the second handle member. A pin clamp or retainer 89d' (See FIGS. 4 and 5) is secured on the end of second locking pin stem 89c' that protrudes out of second locking pin opening 89e' to the opposite side of the handle member 84 opposite the head portion of the second locking pin 89a' for securing and maintaining the drive pawl 79 within the interior cavity 88 and between the first handle member 11 and second handle member 84. In order to secure the drive pawl 79 between the first handle member 11 and second handle member 84, the second locking pin stem 89c' is received through coil spring section 75 through coil spring opening 77 for securing the coil spring section 75 within the drive pawl open space 83 between the opposing drive pawl sides 80. (See FIGS. 3 and 6).

In addition, the drive pawl 79 includes a spring device having a first longer spring leg with a bent end 76 and a second shorter straight spring leg 78 extending from opposite ends of the coil spring section 75 and coil spring opening 77. The coil spring section 75 is disposed and secured within the open space 83 by the locking pin device 89', 89a'-89e'. The second shorter straight spring leg 78 is positioned and extends through the drive pawl open space 83 so that it is supported on a bottom surface 88a of the second handle interior cavity 88.

As shown in FIGS. 2-3 and 6-8, the first longer spring leg 76 extends through the drive pawl open space 83 and rest underneath the upper solid portion having the upper end 81, which closes the back side of the open space 83. With the first longer spring leg 76 resting underneath the solid portion at upper end 81, the drive pawl 79 will push down on the first longer spring leg 76 causing the drive pawl upper end 81 to selectively move intermittently along the plurality of teeth 49b of the blade holders with the catch pawl end 74 being selectively moved intermittently to one of the plurality of teeth 49b that is just behind one of the plurality of teeth 49b that the drive pawl end 81 is received in to selectively ratchet the non-standard cutting tool blade 40 relative to the cradle portions 19 and the inclined surfaces 19a between open and cutting positions so that different size work pieces can be placed on and along the cradle portions 19 and the inclined surfaces 19a so that the non-standard cutting tool blade 40 is actuated in a ratchet manner to cut through different size work pieces.

With the above description of the ratchet assembly 60, a user can cyclically move the cutting tool assembly 10 to a cutting work piece position, when the cutting tool assembly 10 is in a retracted or full open position. In order to achieve this, a user cyclically squeezes the first handle member 11 and second handle member 84 toward one another to cause the drive pawl upper end 81 to selectively move intermittently along the plurality of teeth 49b of the blade holder 46 with the catch pawl end 74 being selectively moved intermittently to one of the plurality of teeth 49b that is just behind one of the plurality of teeth 49b that the drive pawl end 81 is received in until the non-standard cutting tool blade 40 cuts through a work piece positioned on the cradle portions 19 and inclined surfaces 19a when the raised abutment 86a has come into contact with the substantially straight portion of the bottom surface 11b.

Next, after the user has cut the work piece, the user can grab one handle 11 or 84 or both handles 11 and 84 to spread them apart so that the catch pawl 71 and the drive pawl 79 are disengaged from the plurality of teeth 49b, allowing the blade holder 46 to spring backwards until the blade holder stop 48 abuts the interior wall portion within the continuous cavity 27. This position allows a user to replace a non-standard cutting tool blade 40 or start a new cutting operation by the user squeezing the handles 11 and 84 toward one another.

In further details, FIG. 6 shows a latch pin 85a secured within a pair of lock latching pin openings 85 in the opposite side walls 84a at the rear thereof. Lock latching pin 85a receives the bent lock latching member 59a, by pivoting the bent lock latching member 59a underneath the lock latching pin 85a. This provides a tight locking engagement there between.

Now referring to FIG. 8, the U-shaped latch 59 further includes a stop member 59c within the interior cavity 11d near the rear end of the first handle member 11. A slight indented space 11h is surrounded by a pair of protrusions 11f on opposite sides of the interior cavity 11d defined by the opposite side walls 84a that extend slightly inward into the interior cavity 11d. The indented space 11h has a pair of side walls 11g that define the depth of the indented space 11h. The latch openings 58 are disposed within the indented space 11h to receive the bent ends 59b therein. Note that the pair of opposite protrusions 11f that extend slightly inward into the interior cavity 11d by a spring and wedge action along the pair of opposite protrusions 11f at the forward end to achieve a clicking and retaining action by the contracting of the U-shaped latch 59. This action will allow the bent lock latching member 59a to abut stop member 59c and held in that position until a user moves or pivot the U-shaped latch 59 from that held position. When the user moves the lock latching member 59a from the held position, the U-shaped latch 59 will move past the pair of forward protrusions 11f and the pair of forward side walls 11g and expand into the indented space 11h. In this position the U-shaped latch 59 will move and stop against the rear most pair of side walls 11g, until a user moves the U-shaped latch 59 back to the held position.

Figure 4:
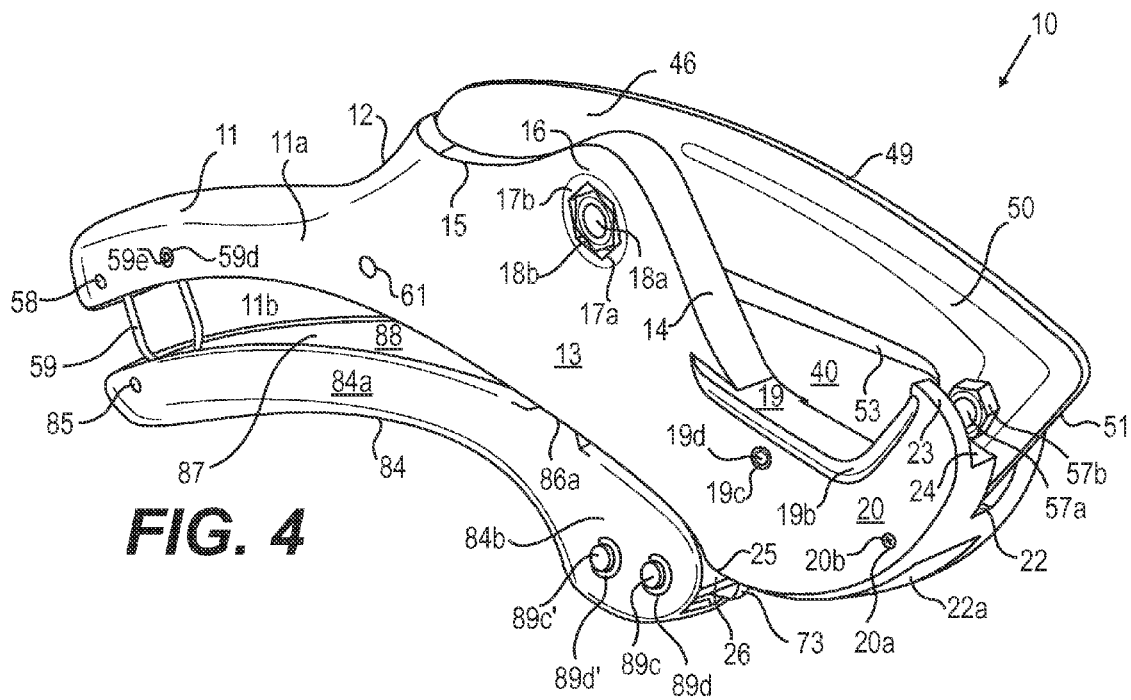
FIG. 4 illustrates an auxiliary view of a closed position of an improved ratchet cutting tool with a sliding replacement and display cutting blade storage tray in accordance to the preferred embodiment of the present invention opposite to the view as shown in FIG. 1.
Figure 5:
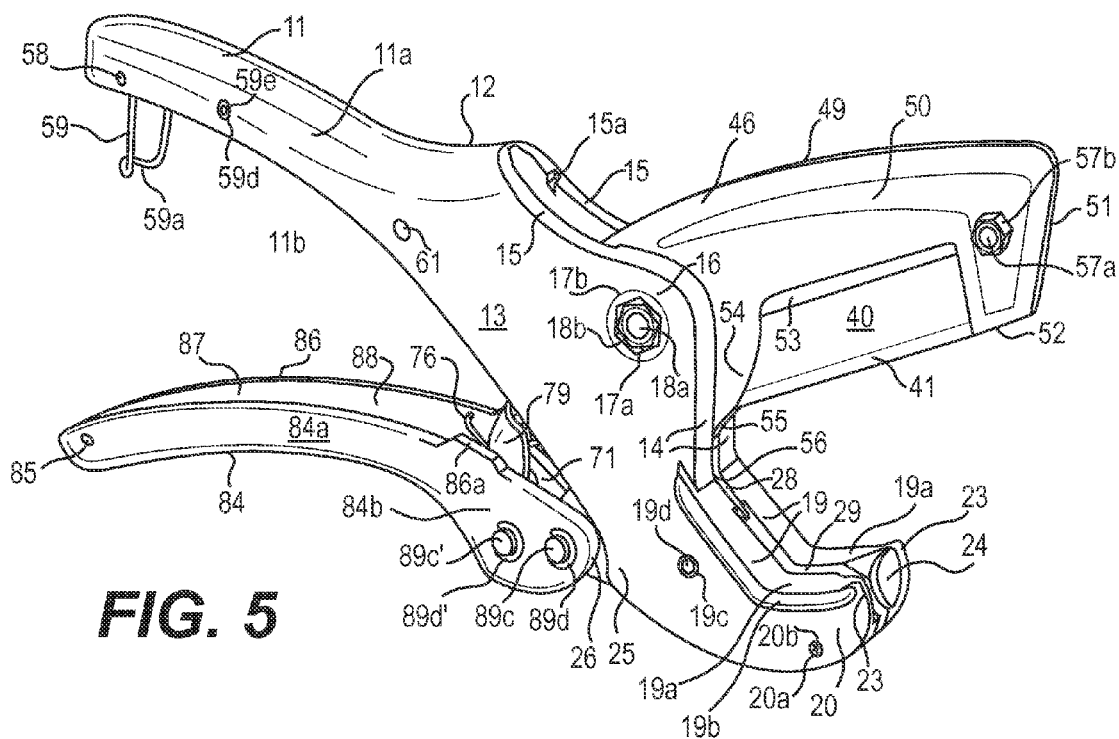
FIG. 5 illustrates an auxiliary view of an open position of the improved ratchet cutting tool with a sliding replacement and display cutting blade storage tray in accordance to the preferred embodiment of the present invention opposite to the view as shown in FIG. 2.

FIGS. 3 and 4, for purposes of this invention illustrates the rear side of the ratchet cutting tool assembly 10. These Figures will only be described to elaborate on some of the different pins, screw, nuts, clamps, pin and screw openings and a reinforced area disposed around the cradle portions 19, 19a that have not been clearly described previously.

The latch stop 59c (See FIG. 8) is retained with the interior cavity 11d of the first handle member 11 by a securing pin 59e received within stop securing opening 59d of FIGS. 3 and 4. Also, an extended raised portion 19b that is positioned underneath the cradle portions 19, 19a acts as reinforced element for added strength for the cradle portions 19, 19a. Below the extended raised portion 19b, a pair of spaced securing openings 19c and 20a are disposed therein to receive retaining screw elements 19d and 20b. Note that the securing openings 19c and 20a extend through the first handle rear section 11 at the cradle portion 19, 19a and partly through the first handle front section 11 at the cradle portion 19, 19a, the opposite side, to secure the two sections together.

All of the securing openings 19c, 20a and 59d are counter bored or deep enough so that the securing pins, screws and nuts are not extending beyond the openings. FIGS. 3 and 4, show the screw 18 with stem 18a that receives the retaining nut 18b that secures the blade holder 46 between the first handle member 11 and the second handle member 84 and allowing the blade holder 46 to pivot or rotate thereabout. In addition, the retaining nut is disposed within a first counter bore 17a of a hexagonal shape to receive a hexagonal retaining nut 18b. Outside of the counter bore 17a is a second counter bore 17b. These counter bores allow for a tool to be inserted therein without damaging the outer face of the rear side of the first handle section 11.

Finally, the two part first handle member 11 can be secured in many ways, such as mechanical bonding, stamping, welding, brazing, screws and nuts, pins, rivets, clamps, to name just a few. Note that the cutting tool assembly 10 can be made from various types of metal materials. However, other types of non-metal materials, such as plastic type materials could be utilized, if desired.

The instant embodiments of the present invention have been described with reference to the preferred embodiments. Obviously, modifications and alterations will occur to others of ordinary skill in the art upon reading and understanding the above detailed description invention. It is intended that the instant embodiments of the present invention be construed as including all such modifications and alterations insofar as they come within the scope of the appended claims or the equivalents thereof.

What is claimed is:

1. A ratchet cutting tool assembly for cutting a work piece comprising:
   a first handle member including a hand gripping portion at a rear contoured end, a cradle portion at a forward end, an intermediate portion connected there between by a ramp portion, a ratchet pin securing hole disposed at a bottom end portion of the first handle member and extension members projecting downward from a bottom portion of the first handle member with securing openings there through;
   a continuous open cavity of different dimensions being disposed within the first handle member, the open cavity extends at least between a portion of the rear contoured end, the ramp portion, the extension members and to at least a portion of the cradle portion;
   a second handle member including a hand gripping portion at a first contoured end, a second retaining end having a plurality of spaced retaining openings;
   a blade holder including a rear portion having a plurality of spaced teeth disposed on a rear end thereof, a screw receiving hole disposed on the rear portion spaced from the plurality of spaced teeth, an angled forward end and an intermediate portion defining a replacement blade cavity extending between the angled forward end and the screw receiving hole to receive replacement cutting blade with opposite angled ends;
   a securing screw opening disposed at a location below an apex of the ramp portion, a screw element is disposed through the securing opening of the ramp portion and through the screw receiving hole of the blade holder and retained by a screw nut to secure the first and second handle members and the blade holder together; and
   an improved ratchet assembly cooperatively associated and secured between the first and second handle members and the blade holder to cause a cyclic and intermittent movement of the replacement cutting blade between cutting and retracted positions by squeezing and pulling apart the first and second handle members, respectively.

2. The ratchet cutting tool assembly for cutting a work piece according to claim 1, wherein the blade holder further includes a slot operatively associated with the ratchet assembly and a stop member disposed on at least one side of the blade holder adjacent the rear end thereof.

3. The ratchet cutting tool assembly for cutting a work piece according to claim 2, wherein the improved ratchet assembly only includes a catch pawl, a catch pawl coil spring, a drive pawl and a drive pawl coil spring to cooperate with the plurality of spaced teeth of the blade holder, the catch pawl has a configuration with multiple and different angled connected sides with an upper catch end with a spring opening, a bottom end with a securing pin opening, the catch pawl coil spring having a coil spring section with an opening there through, one end of the catch pawl coil spring section has a first leg portion with bent portions at the end thereof forming a U-shape to be received within the spring opening of the upper catch end, the other end of the catch pawl coil spring section has a second leg portion with a bent portion at the end thereof for operatively engaging a slot spaced from and inward of the plurality of spaced teeth of the blade holder, the drive pawl has an elongated shape with a pair of side walls that has an upper wider dimensional portion with a thinner dimensional portion extending downward to an end defining securing pin openings therein, the pair of side walls forms an interior space that is open there through from the bottom end upward to a specified distance defining a solid closed portion with a top end that cooperates with the plurality of spaced teeth of the blade holder, and the drive pawl coil spring having a coil section with an opening there through.

4. The ratchet cutting tool assembly for cutting a work piece according to claim 3, wherein the catch pawl is secured within an elongated contoured interior cavity of the second handle member at a forward most end thereof by the second retaining end with the plurality of spaced retaining openings, a pair of spaced first and second locking pin members located at a forward most end of the second handle member, the first spaced locking pin member is disposed through a pair of the plurality of spaced retaining openings located at a forward most end of the second handle member, through the securing openings of the extension members of the first handle member and through an opening in a lower end of the catch pawl disposed there between within the elongated contoured interior cavity of the second handle member and retained therein by a pin clamp retainer, while simultaneously securing the first and second handle members together, a second spaced locking pin member being disposed through another pair of the plurality of spaced retaining openings spaced from the first pair of the plurality of spaced retaining openings located at the forward most end of the second handle member, through securing openings at a lower end of the drive pawl disposed within the elongated contoured interior cavity of the second handle member, through a coil spring securing opening that aligns with the securing openings at the lower end of the drive pawl and retained therein by a pin clamp retainer, while simultaneously securing the first and second handle members together.

5. The ratchet cutting tool assembly for cutting a work piece according to claim 4, wherein the catch pawl coil spring and the catch pawl coil spring section are disposed within a contoured interior cavity formed between a pair of interior wall portions of the first handle member, the contoured interior cavity includes a pair of protruding wall members that extend a specified distance into the contoured interior cavity, the catch pawl coil spring section is positioned between the protruding wall members and retained there between by a retaining pin being inserted through a pair of aligned openings disposed on opposite sides of the first handle member and through the opening of the catch pawl coil spring section to secure the catch pawl coil spring section within the contoured interior cavity of the first handle member, the U-shaped bent portions are inserted through the spring opening of the upper catch end with the upper catch end being supported by and secured to the U-shaped bent portions for completely securing the catch pawl, the catch pawl coil spring and the catch pawl coil spring section within the interior cavities of the first and second handle members.

6. The ratchet cutting tool assembly for cutting a work piece according to claim 5, wherein the drive pawl coil spring includes a first longer leg with a radially extending bent end and a second shorter straight leg extending from opposite ends of the drive pawl coil spring coil section, the drive pawl coil spring coil section is disposed and secured within an open space formed between a pair of elongated side walls of the drive pawl by the second spaced locking pin member, the second shorter straight leg is positioned and extends through the open space so that it is supported on a bottom surface of the second handle member interior cavity, the first longer leg extends through the open space and rests underneath an upper solid portion of the elongated side walls of the drive pawl at an upper end thereof, which closes a back side of the open space at the upper end of the elongated side walls of the drive pawl, the first longer leg rests underneath the solid portion at the upper end thereof, the drive pawl pushes down on the first longer leg causing the drive pawl upper end to selectively move intermittently along the plurality of teeth of the blade holder with the catch pawl upper end being selectively moved intermittently to one of the plurality of teeth that is just behind one of the plurality of teeth that the drive pawl upper end is received in during the cutting of a work piece placed in the cradle portion, and the first leg portion with the bent portions at the end thereof is connected to the upper end of the catch pawl coil spring and the second leg portion with the bent portion at the end thereof is connected in the slot spaced from the plurality of teeth of the blade holder, which will cause the coil spring section of the catch pawl coil spring to expand and separate upper engaging ends of the catch pawl and the drive pawl, while simultaneously rotating the blade holder until the stop member disposed on the at least one side of the blade holder abuts an interior surface with the interior cavity of the first handle member.

7. The ratchet cutting tool assembly according to claim 5, wherein the rear contoured end of the first handle member includes a U-shaped latch with one end having perpendicular bent ends pivotally secured within a latch opening disposed on opposite sides of the rear contoured end of the first handle member, a bottom end that is bent upward and extending perpendicular to the U-shaped latch defining a lock latching member, and opposite rear end sides of the second handle member include latch pin openings therein for receiving a latching pin for latching the lock latching member relative thereto for locking the first and the second handle members together.

8. The ratchet cutting tool assembly for cutting a work piece according to claim 1, wherein the ramp portion includes separate and spaced ascending ramp members and separate and spaced descending ramp members with the apex being the highest point there between on opposite sides of the first handle member, the rear contoured end hand gripping portion of the first handle member further include an arcuate-like portion that extends upward to a lower end of each of the separate and spaced ascending ramp members, and each of the separate and spaced descending ramp members having a bottom end that is extended to a first end of the cradle portion.

9. The ratchet cutting tool assembly for cutting a work piece according to claim 8, wherein the first handle member further includes a sliding replacement and display blade storage tray cavity disposed along at least one of exterior side faces of the first handle member extending from the arcuate-like portion of the rear contoured end hand gripping portion of the first handle member to a location below at least a portion of the cradle portion, wherein the cradle portion is defined by a pair of separate and spaced cradle portions on opposite sides of the first handle member.

10. The ratchet cutting tool assembly for cutting a work piece according to claim 9, wherein the sliding replacement and display blade storage tray cavity is disposed between the bottom end portion of the first handle member, the ramp portion and the at least a portion of the pair of separate and spaced cradle portions on at least one side wall surface of the first handle member, which is configured to receive a sliding replacement and display blade storage tray assembly therein.

11. The ratchet cutting tool assembly for cutting a work piece according to claim 9, wherein the sliding replacement and display blade storage tray cavity includes an angled end of a preferred angle and the other end having an arcuate-like shape that compliments and mates with the arcuate-like portion of the rear contoured end hand gripping portion of the first handle member defining end notches at lower and upper ends thereof, and the sliding replacement and display blade storage tray cavity further includes an upper exterior wall portion with a downward extending upper end wall surface and a lower exterior wall portion with an upward extending lower end wall surface with the end notches defining upper and lower elongated recessed receiving channels extending there between and along the entire length thereof, wherein the upper and lower elongated recessed receiving channels being disposed at a selected depth inward of the upper and lower exterior wall portions, respectively.

12. The ratchet cutting tool assembly for cutting a work piece according to claim 11, wherein the sliding replacement and display blade storage tray assembly includes a pair of ends, one end having a contoured or arcuate-like end and the other end defining a preferred angled closed end, the contoured or arcuate-like end has a pair of upper and a pair of lower wall receiving projection surfaces defining a pair of top and bottom wall ends respectively, and extending between the contoured or arcuate-like end to the angled closed end of the sliding replacement and display blade storage tray assembly, the pair of upper wall receiving projection surfaces of the sliding replacement and display blade storage tray assembly further includes a rear wall top portion and a front wall top portion defining a rear upper end surface and a front upper end surface that is slightly shorter in height than the rear upper end surface forming a replacement blade opening there between, which extends along the entire length of the sliding replacement and display blade storage tray assembly from the contoured or arcuate-like end to the angled closed end.

13. The ratchet cutting tool assembly for cutting a work piece according to claim 12, wherein the pair of lower wall receiving projection surfaces further includes a front wall bottom portion defining a front lower end surface that is slightly shorter in height than a rear lower end surface and closed by a lower wall member to define a closed bottom portion of the sliding replacement and display blade storage tray assembly below the replacement blade opening, which extends along the entire length of the sliding replacement and display blade storage tray assembly from the contoured or arcuate-like end to the angled closed end thereof.

14. The ratchet cutting tool assembly for cutting a work piece according to claim 13, wherein the pair of upper wall receiving projection surfaces allow the slightly shorter front upper end surface to slide along the downward extending upper end wall surface and the rear upper end surface is slidably received within the upper elongated recessed receiving channel, the pair of lower wall receiving projection surfaces allow the slightly shorter front lower end surface to slide along the upward extending lower end wall surface and the rear lower end surface is adapted to slide along and within the lower elongated recessed receiving channel, until the preferred angled closed end of the sliding replacement and display blade storage tray assembly abuts with the preferred angled end of the sliding replacement and display blade storage tray cavity and the contoured or arcuate-like end of the sliding replacement and display blade storage tray assembly engages and mates with an arcuate-like inside edge surface of the arcuate-like portion of the rear contoured end hand gripping portion of the first handle member, forming a continuous smooth surface there between when the sliding replacement and display blade storage tray assembly has been fully inserted in the sliding replacement and display blade storage tray cavity.

15. The ratchet cutting tool assembly for cutting a work piece according to claim 14, wherein a retaining assembly includes a retaining slot formed in at least one of the separate and spaced ascending ramp members adjacent to the arcuate-like portion of the rear contoured end hand gripping portion of the first handle member, an L-shaped retaining slot defining a short leg portion and a longer leg portion extending perpendicular there from and extending from a top portion of the rear upper end surface of the rear wall top portion of the sliding replacement and display blade storage tray assembly to a specified spaced distance there below and a slot retaining device includes a handle or grip member, a grip extension member, a L-shaped retaining stem with a short stem leg portion at an upper end thereof, a longer stem leg portion extending from the short stem leg portion to a retaining bead or bubble member disposed at a lower end of the longer stem leg portion and having a certain degree of flexibility, thereby allowing the longer stem leg portion with the bead or bubble member to be inserted into the retaining slot of the at least one of the separate and spaced ascending ramp members, into the short leg portion of the L-shaped retaining slot and then into the longer leg portion of the L-shaped retaining slot to retain the sliding replacement and display blade storage tray assembly within the sliding replacement and display blade storage tray cavity, while allowing the bead or bubble member to be easily inserted therein and removed there from by the handle or grip member and the grip extension member without getting the short stem leg portion from getting stuck or jammed within the short leg portion of the L-shaped retaining slot due to the certain degree of flexibility.

16. The ratchet cutting tool assembly for cutting a work piece according to claim 15, wherein the handle or grip member and the grip extension member extend over the contoured or arcuate-like portion of the sliding replacement and display blade storage tray assembly, so that a user can easily grasp them and pull the slot retaining device from the L-shaped retaining slot with ease.

17. A cutting tool assembly comprising:
a first handle member including hand gripping portions at a rear contoured end, cradle portions at a forward end, intermediate portions connected there between by ramp portions;
a second handle member including a hand gripping portion at a first contoured end, a second retaining end having a plurality of spaced retaining openings;
an open cavity being disposed within the first handle member, the open cavity extends at least between a portion of the rear contoured end, the ramp portions, a pair of downward projecting extension members and to at least a portion of the cradle portions;
a blade holder is disposed within at least a portion of the open cavity, the blade holder includes a rear portion having a plurality of spaced teeth disposed thereon, a screw receiving hole disposed on the rear portion spaced from the plurality of spaced teeth, an angled forward end and a blade receiving cavity formed between the angled forward end and the screw receiving hole for receiving a replacement cutting tool blade;
a securing screw opening disposed at a location below an apex of the ramp portions, a screw element inserted through the securing screw opening of the ramp portions and through the screw receiving hole of the blade holder and retained by a screw nut to secure the first and second handle members and the blade holder together; and
a ratchet mechanism cooperatively associated with the first and second handle members and the plurality of spaced teeth to cause a cyclic and intermittent movement of the replacement cutting tool blade between cutting and retracted positions by squeezing and pulling apart the first and second handle members, respectively.

18. The cutting tool assembly according to claim 17, wherein the first handle member further includes a sliding replacement and display blade storage tray cavity disposed along at least one of the exterior side faces of the first handle member extending from an arcuate-like end portion of the first handle member to a location below at least a portion of the cradle portions.

19. The cutting tool assembly according to claim 18, wherein the sliding replacement and display blade storage tray cavity includes an angled end of a preferred angle and the other end having an arcuate-like shape that mates with the arcuate-like end portion of the first handle member defining end notches at the lower and upper ends thereof, which forms an elongated recessed receiving channel extending from each of the end notches to the angled end of the sliding replacement and display blade storage tray cavity, the elongated recessed receiving channel at a lower end of the sliding replacement and display blade storage tray cavity includes an upward extending wall surface and the elongated recessed receiving channel at an upper end of the sliding replacement and display blade storage tray cavity includes a downward projecting wall surface.

20. The cutting tool assembly according to claim 19, wherein a sliding replacement and display blade storage tray assembly having a pair of upper and a pair of lower wall receiving projection surfaces defining a pair of top and bottom wall ends and extending between an arcuate-like end portion to a closed angled end of the sliding replacement and display blade storage tray assembly, the pair of upper wall receiving projection surfaces of the sliding replacement and display blade storage tray assembly further includes a top wall portion defining a rear upper end surface and a front upper end surface that is slightly shorter in height than the rear upper end surface with a replacement blade opening formed there between, the pair of lower wall receiving projection surfaces further includes a lower wall bottom portion defining a lower end surface that is slightly shorter in height than a rear lower end surface with a lower closed bottom wall member there between to close a bottom of the sliding replacement and display blade storage tray assembly and being below and spaced a selected distance from the replacement blade opening so that the replacement cutting tool blade can be inserted there through or removed there from, the pair of upper and the pair of lower wall receiving projection surfaces are adapted to allow the front upper end surface to slide along the downward projecting wall surface of the elongated recessed receiving channel at the upper end and the rear upper end surface will move along and within the elongated recessed receiving channel at the upper end, and the lower end surface slides along the upward extending wall surface of the elongated recessed receiving channel at the lower end and the rear lower end surface will move along and within the elongated recessed receiving channel at the lower end, until the closed angled end of the sliding replacement and display blade storage tray assembly abuts with the angled end of the replacement and display blade storage tray cavity and the arcuate-like end portion of the sliding replacement and display blade storage tray assembly engages and mates with the arcuate-like end portion of the first handle member, forming a continuous smooth surface there between when the sliding replacement and display blade storage tray assembly has been fully inserted in the sliding replacement and display blade storage tray cavity.

\* \* \* \* \*